US009703575B2

(12) United States Patent
Fu et al.

(10) Patent No.: US 9,703,575 B2
(45) Date of Patent: Jul. 11, 2017

(54) MEDIA FILE PLAYING METHOD AND DEVICE, MEDIUM AND BROWSER

(71) Applicant: Tencent Technology (Shenzhen) Company Limited, Shenzhen, Guangdong (CN)

(72) Inventors: Hongcheng Fu, Guangdong (CN); Zhengguo Zhang, Guangdong (CN); Qing Zhang, Guangdong (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 0 days.

(21) Appl. No.: 15/039,367

(22) PCT Filed: Oct. 28, 2014

(86) PCT No.: PCT/CN2014/089647

§ 371 (c)(1),
(2) Date: May 25, 2016

(87) PCT Pub. No.: WO2015/078253

PCT Pub. Date: Jun. 4, 2015

(65) Prior Publication Data

US 2017/0139722 A1 May 18, 2017

(30) Foreign Application Priority Data

Nov. 26, 2013 (CN) .......................... 2013 1 0608510

(51) Int. Cl.

*G06F 9/44* (2006.01)
*G06F 3/048* (2013.01)
*G06F 3/0481* (2013.01)

(52) U.S. Cl.

CPC .......... *G06F 9/4443* (2013.01); *G06F 3/0481* (2013.01)

(58) Field of Classification Search

CPC ............................ G06F 9/4443; G06F 3/0481
See application file for complete search history.

(56) References Cited

U.S. PATENT DOCUMENTS

2002/0196273 A1 12/2002 Krause
2011/0113354 A1* 5/2011 Thiyagarajan ........... G09G 5/14 715/760
2013/0167005 A1 6/2013 Corbett et al.

FOREIGN PATENT DOCUMENTS

CN 101076089 A 11/2007
CN 101102475 A 1/2008
(Continued)

OTHER PUBLICATIONS

Office Action dated Nov. 30, 2016 for Chinese Application No. 201310608510.2, 6 pages.
(Continued)

*Primary Examiner* — Andrea Long
(74) *Attorney, Agent, or Firm* — Brinks Gilson & Lione

(57) ABSTRACT

A media file playing method and device. The method comprises: submitting information about a media file to a first window; judging whether the first window is a browser top window; if so, creating a sub-window in the browser top window, setting the sub-window as the first window, loading player logic in the browser top window, and playing the media file by using the player logic in the browser top window; otherwise, transmitting, by the first window, the information about the media file to the browser top window to which the first window belongs, and playing the media file by using the player logic in the browser top window. By means of the present invention, it can be achieved that a webpage player window can play a new media file without refreshing when playing requests of other webpage browser windows are received.

19 Claims, 3 Drawing Sheets submitting medium file information to a first window — 101

102 — determining whether the first window is a top-level window of a browser

Yes → 103 — creating a sub-window in the top-level window of the browser, setting the sub-window as the first window, loading a player logic in the top-level window of the browser, and playing the medium file by using the player logic in the top-level window of the browser No → 104 — transferring the medium file information to the top-level window of the browser to which the first window belongs, and playing the medium file by using the player logic in the top-level window of the browser

(56) References Cited

FOREIGN PATENT DOCUMENTS

| | | | |
|---|---|---|---|
| CN | 101227594 | A | 7/2008 |
| CN | 101493837 | A | 7/2009 |
| CN | 101763434 | A | 6/2010 |
| CN | 101873325 | A | 10/2010 |
| CN | 103246665 | A | 8/2013 |
| CN | 104090820 | A | 10/2014 |
| SG | 173590 | A1 | 9/2011 |

OTHER PUBLICATIONS

International Search Report mailed Feb. 2, 2015 for PCT Application No. PCT/CN2014/089647 (English and Chinese languages), 18 pp.

* cited by examiner

MEDIA FILE PLAYING METHOD AND DEVICE, MEDIUM AND BROWSER

CROSS REFERENCE TO RELATED APPLICATION

The present application is the national phase of International Application No. PCT/CN2014/089647, titled "MEDIA FILE PLAYING METHOD AND DEVICE, MEDIUM AND BROWSER", filed on Oct. 28, 2014, which claims priority to Chinese Patent Application No. 201310608510.2, titled "METHOD AND DEVICE FOR PLAYING MULTIMEDIA FILE IN WEBPAGE" and filed on Nov. 26, 2013 with the State Intellectual Property Office of People's Republic of China, both of which are incorporated herein by reference in their entireties.

TECHNICAL FIELD

The present disclosure relates to the technical field of web player, and in particular to a method and a device for playing a media file.

BACKGROUND

A web player is a player achieved by using a web technology (such as html, javascript, flash, css) and a play plug-in (such as a wmp music play plug-in, a flash music play plug-in, a QQ music play plug-in and a html5 audio play plug-in) of a browser in a window of a web browser.

In general, each time when a song is to be played by using the web player, the web player is opened by a browser window with a same name, so that the web player can be always opened in the same browser window of the browser, which ensures that there is only one web player playing the song.

In the conventional technology, it can be achieved that only one web browser is opened to play a song, but each time when a new song is to be played by using the opened web player, the web player window is reloaded, which cause refreshing a page of the web player window and reinitializing the page of the web player window, thereby causing a long time delay.

SUMMARY

A method for playing a media file is provided according to the present disclosure, so that a web player window can play a new media file without refreshing a page, when receiving a playing request from another web browser window.

A device for playing a media file is further provided according to the present disclosure, so that a web player window may play a new media file without refreshing a page, when receiving a playing request from another web browser window.

The method for playing a media file includes:

submitting media file information to a first window; and determining whether the first window is a top-level window of a browser; creating a sub-window in the top-level window of the browser, setting the sub-window as the first window, loading a player logic in the top-level window of the browser, and playing the media file by using the player logic in the top-level window of the browser, in case that the first window is determined as the top-level window; and transferring the media file information to the top-level window of the browser to which the first window belongs, and playing the media file by using the player logic in the top-level window of the browser, in case that the first window is not determined as the top-level window.

In the above method, the process of submitting the media file information to the first window includes:

determining whether there is the first window; submitting directly the media file information to the first window, in case that there is the first window; and creating a first window and submitting the media file information to the first window, in case that there is no first window; where the first window is a browser window whose name is a preset name.

The process of creating a sub-window in the top-level window of the browser, and setting the sub-window as the first window of the browser includes:

modifying a name of the top-level window of the browser as a name different from the preset name, creating a hidden sub-window in the top-level window of the browser, and naming the hidden sub-window as the preset name.

In the method, the media file may be an audio file or a video file, etc.

A device for playing a media file includes:

a data transferring module, configured to submit a media file to a first window; and a playing module, configured to determine whether the first window is a top-level window of a browser; create a sub-window in the top-level window of the browser, setting the sub-window as the first window, loading a player logic in the top-level window of the browser, and playing the media file by using the player logic in the top-level window of the browser, in case that the first window is determined as the top-level window; and transferring the media file information to the top-level window of the browser to which the first window belongs, and playing the media file by using the player logic in the top-level window of the browser, in case that the first window is not determined as the top-level window.

In the device, the process of submitting the media file information to the first window by the data transferring module includes:

determining whether there is the first window; submitting directly the media file information to the first window, in case that there is the first window; and creating a first window and submitting the media file information to the first window, in case that there is no first window; where the first window is a browser window whose name is a preset name.

In the device, the process of creating a sub-window in the top-level window of the browser, and setting the sub-window as the first window of the browser includes:

modifying a name of the top-level window of the browser as a name different from the preset name, creating a hidden sub-window in the top-level window of the browser, and naming the hidden sub-window as the preset name.

A media and a browser for achieving the method are further provided according to embodiments of the present disclosure.

The media file may be an audio file or a video file, etc.

With the method and the device for playing a media file, a window is created by a player page as a data transferring page such as a hidden iframe window; a media file is submitted to the data transferring page; and a dynamic scripting language of a top-level player page is directly invoked by a scripting language of the data transferring page to achieve playing the media file without refreshing a page for user perception. The method is achieved without resubmitting the media file to the player and refreshing the whole player, thereby avoiding refreshing the whole player when a new media file is loaded and played, and reducing the time delay. Since the data transferring page is a hidden iframe, when a playing page with a playlist submits data to the data transferring page, the data transferring page refreshes, but a user can not perceive that the data transferring page is refreshed.

DETAILED DESCRIPTION OF THE EMBODIMENTS

Figure 1:
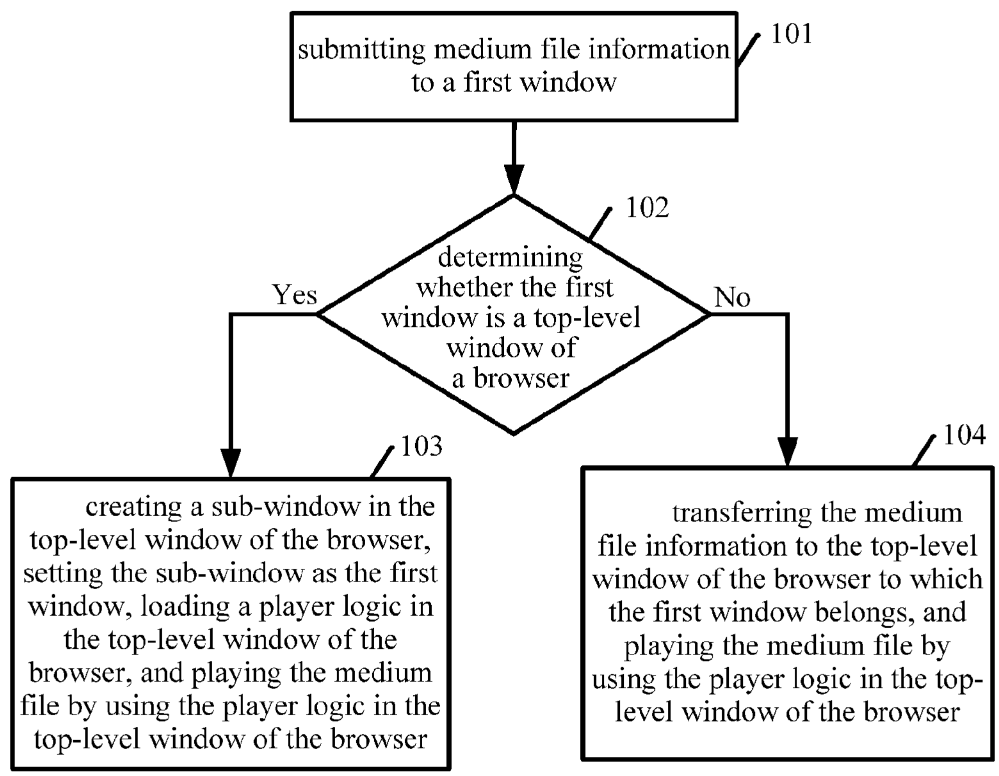
FIG. 1 is a flow chart of a method for playing a media file according to a first embodiment of the disclosure.

A method for playing a media file is provided according to the disclosure. FIG. 1 shows a flow chart of the method. The method includes steps S101 to S104.

In step S101, media file information is submitted to a first window.

The media file information may be information such as a storage location of a media file.

In step S102, whether the first window is a top-level window of a browser is determined. Step 103 is proceeded, if he first window is the top-level window of the browser; and step S104 is proceeded, if the first window is not the top-level window of the browser.

In step S103, a sub-window is created in the top-level window of the browser and is set as the first window of the browser, a player logic is loaded in the top-level window of the browser, and a media file is played by using the player logic in the top-level window of the browser.

The player logic refers to an interface of the player and a control method thereof.

In step S104, the media file information is transferred from the first window to the top-level window to which the first window belongs, and the media file is played by using the player logic in the top-level window of the browser.

The special implementation of S101 may include:

determining whether there is the first window; submitting directly the media file information to the first window, if there is the first window; and creating a first window, and submitting the media file information to the first window, if there is no first window; wherein the first window is a browser window with a preset name.

In the step S103, the process of creating the sub-window in the top-level window of the browser, and setting the sub-window as the first window of the browser may include:

modifying a name of the top-level window of the browser as a name different from the preset name, creating a hidden sub-window in the top-level window of the browser, and naming the hidden sub-window as the preset name.

In the disclosure, a window is a frame realized in a computer system. The window may be visible or invisible to a user. The window may be an interface which exists independently, or an interface whose existence is not independent and has to depend on another window.

In the disclosure, the window may be associated with an application. For example, the browser window refers to a window associated with a browser application. For another example, the browser window may be a browser page, or a browser instance.

In the disclosure, the top-level window refers to an outermost window container which may exist independently. The top-level window may contain one or more derived sub-windows; and the sub-window is created in the top-level window or in a lower-level sub-window of the top-level window. For example, an iframe created in a top-level window is a sub-window of the top-level window. It may be understood for a person of ordinary skill in the art that the sub-window may have one or more derived sub-windows.

Windows with nested relationship may be created in an application window. An outer window is called as a parent window; and an inner window is called as a sub-window. A sub-window has to depend on a corresponding parent window and cannot exist independently.

In the disclosure, the top-level window of the browser to which a sub-window belongs refers to an outmost window container opened by a current browser. The sub-window is created in the top-level window or in a sub-window of the top-level window, and the existence of the sub-window depends on the top-level window.

In the disclosure, the hidden sub-window refers to a sub-window invisible to the user and created in a window.

In the method, the media file may be an audio file or a video file, etc.

Hereinafter specific embodiments are described in detail in conjunction with the drawings.

First Embodiment

In the embodiment, a media file is a song.

In the embodiment, a way, in which a window object of a web browser is named and a window of a web browser named as a preset name is used as a data transferring page to transfer song data, is mainly used. In the embodiment, the preset name of the data transferring page is playWindow1.

There are two kinds of windows of a web browser according to a hierarchical relationship. The first kind is a top-level window which is an outmost window opened by the browser; and the second kind is an iframe created in the top-level window of the browser. The page in a top-level window and the page in a sub-window may access each other and transfer data between each other through a dynamic scripting language such as javascript, in the case that the loaded pages belong to a same domain name.

Figure 2:
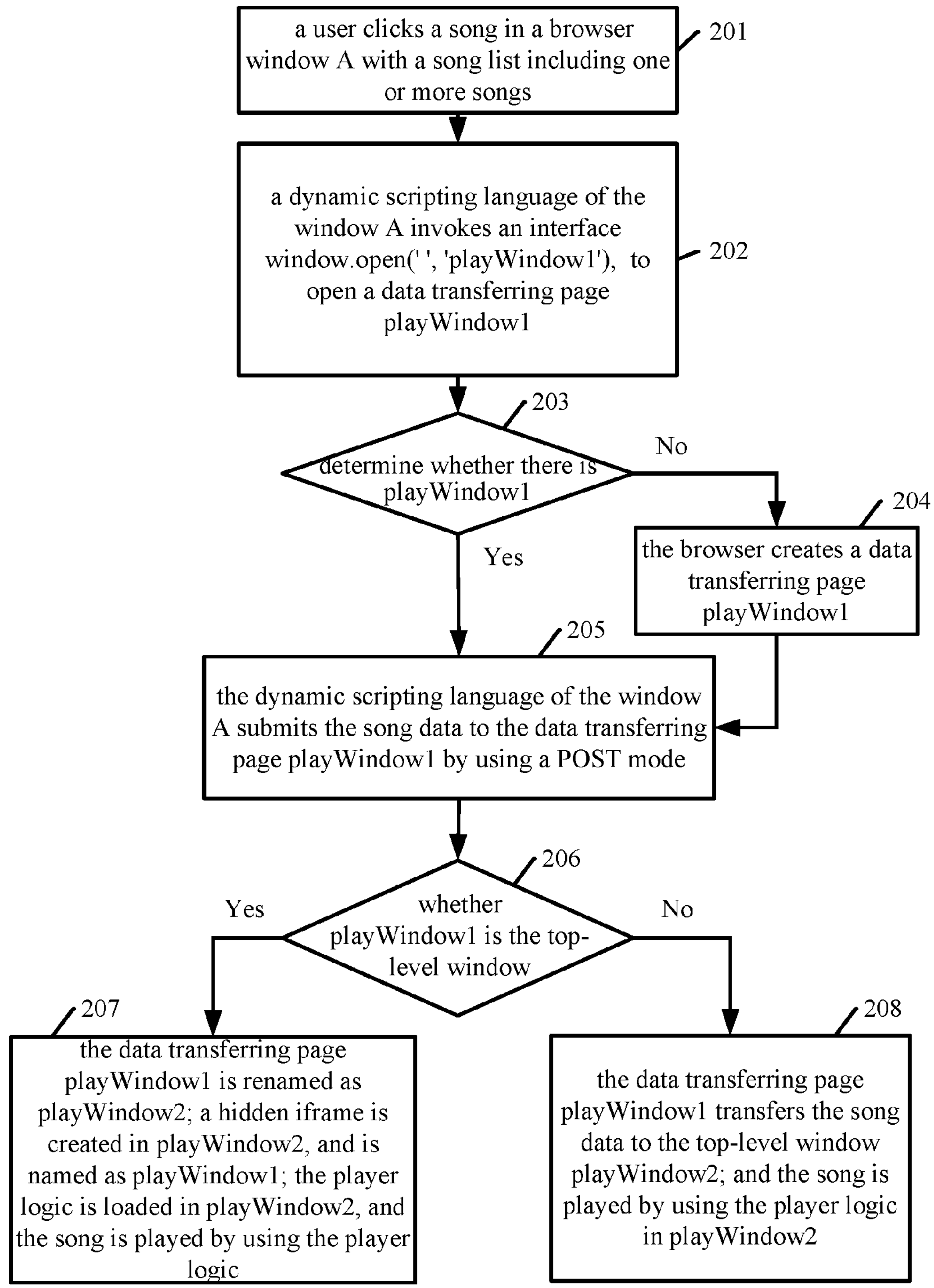
FIG. 2 is a flow chart of a method for playing a media file according to another embodiment of the disclosure.

FIG. 2 shows a flow chart of a method according to the embodiment. The method includes step S201 to S208.

In step S201, a user clicks on a song to play the song in a browser window A with a song list including one or more songs.

In step S202, a dynamic scripting language of the window A such as javascript invokes an interface window.open (' ', 'playWindow1') of the browser with respect to opening a window, to open a data transferring page named as playWindow1.

In step S203, the browser determines whether there is the data transferring page playWindow1, namely a browser window named as playWindow1. Step 204 is proceeded, in case that there is no data transferring page playWindow1; and step 205 is proceeded, in case that there is the data transferring page playWindow1.

In step S204, the browser creates the data transferring page named as playWindow1, and step S205 is proceeded.

In step S205, the dynamic scripting language of the window A such as javascript submits the song data to the data transferring page named as playWindow1 by using a POST mode. The reason for using the POST mode to submit the song data to the data transferring page is that a length of URL in the GET mode is limited in the browser and little information can be transfer in the GET mode while a length of the submitted data is not limited in the POST mode.

In step S206, the dynamic scripting language in the controlling module of the data transferring page named as playWindow1 determines whether the data transferring page playWindow1 is the top-level window of the browser. If the data transferring page playWindow1 is the top-level window of the browser, it is indicated that the data transferring page is opened for the first time, a logic of a web player is not loaded, and the browser window needs to be redirected to a final page of the web player, and step s207 is proceeded; and if the data transferring page playWindow1 is not the top-level window of the browser, it is indicated that logic of the web player is loaded and the data transferring page playWindow1 is a hidden iframe sub-window in the top-level window of the browser, and step s208 is proceeded.

In step S207, the logic of the web player is loaded in the top-level window of the browser, and the name of the top-level window of the browser is changed from the name playWindow1 originally belonging to the data transferring page to another name such as playWindow2. The hidden iframe sub-window is created in the top-level window of the browser named playWindow2, the hidden IFRAME sub-window is named as playWindow1, and the hidden IFRAME sub-window is a new data transferring page. The logic of the web player is loaded in the top-level window of the browser named playWindow2, data information of the song to be played is directly transferred to the logic of the web player, and the song corresponding to the song data is played by the logic of the web player. The method is ended.

In step S208, the data transferring page playWindow1 invokes, by using the dynamic scripting language such as javascript, an interface of the player logic of the parent window of the data transferring page playWindow1, and transfers the song data to the top-level window such as playWindow2 to which the data transferring page belongs. The song corresponding to the song data is played by using the player logic in playWindow2. The scripting language such as javascript in the data transferring page playWindow1 directly invokes a playing interface of the player logic of the parent window playWindow2 to play the song, thereby achieving the playing without refreshing the page of the web player for the user perception.

With the method, when receiving a playing request from other web browser, an independent and unique web player window may play a new song without reloading a web player page.

Figure 3:
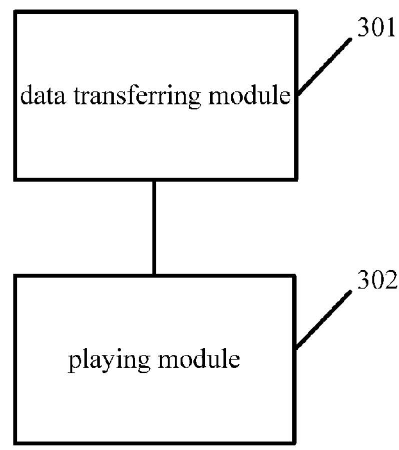
FIG. 3 is a schematic structural diagram of a device for playing a media file according to the disclosure.

A device for playing a media file is further provided according to the disclosure. FIG. 3 shows a schematic structural diagram of the device. The device includes:

a data transferring module 301, configured to submit a media file to a first window; and a playing module 302, configured to determine whether the first window is a top-level window of a browser; to create a sub-window in the top-level window of the browser, set the sub-window as the first window, load a player logic in the top-level window of the browser, and play the media file by using the player logic in the top-level window of the browser, in case that the first window is determined as the top-level window; and to transfer the media file information to the top-level window of the browser to which the first window belongs, and play the media file by using the player logic in the top-level window of the browser, in case that the first window is not determined as the top-level window.

In the above device, the process of submitting the media file information to the first window by the data transferring module 301 may include:

determining whether there is the first window; submitting directly the media file information to the first window, in case that there is the first window; and creating a first window; and submitting the media file information to the first window, in case that there is no first window, where the first window is a browser window whose name is a preset name.

The process of creating a sub-window in the top-level window of the browser, and setting the sub-window as the first window of the browser by the playing module 302 may include:

modifying a name of the top-level window of the browser as a name different from the preset name, creating a hidden sub-window in the top-level window of the browser, and naming the hidden sub-window as the preset name.

In the above device, the media file may be an audio file or a video file, etc.

Figure 4:
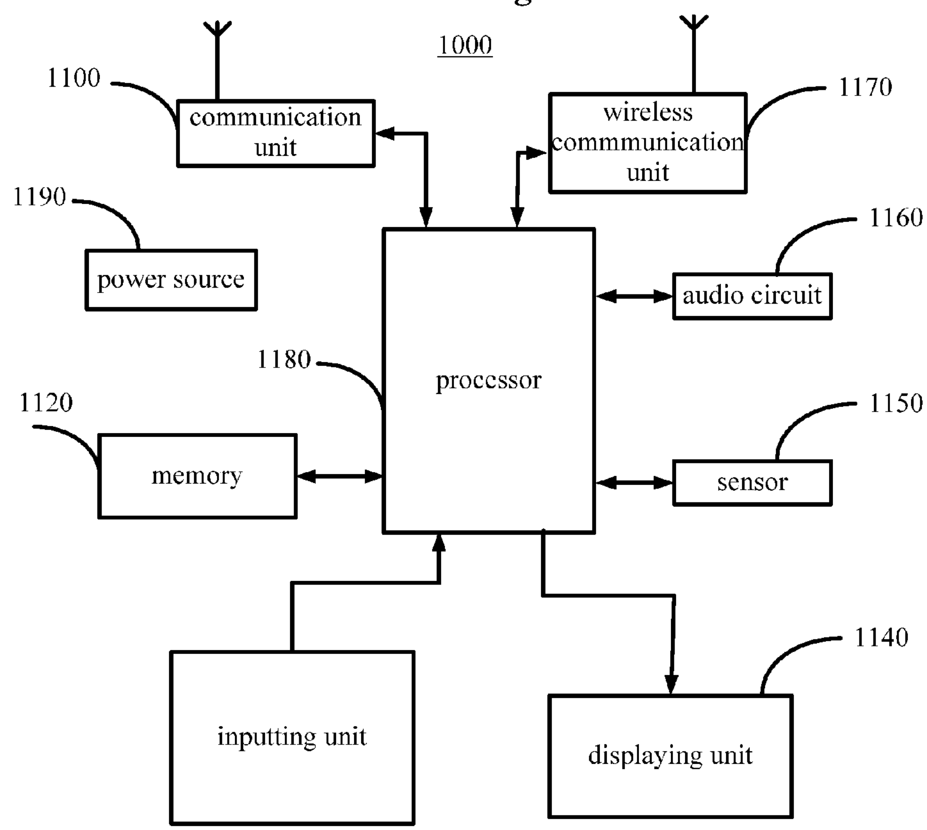
FIG. 4 is a schematic diagram of a hardware structure of a device for playing a media file according to an embodiment of the disclosure.

FIG. 4 is a schematic diagram of a hardware structure of a device for playing a media file according to an embodiment of the disclosure. The media playing device may be a terminal device such as a mobile phone, a tablet computer, a personal digital assistant (PDA), a point of sales (POS) and an auto pc, etc, which is not limited in the disclosure.

The media playing device 1000 may include a communication unit 1110, one or more memories 1120 of a computer readable storage media, an inputting unit 1130, a displaying unit 1140, a sensor 1150, an audio circuit 1160, a wireless fidelity (WiFi) module 1170, one or more processors 1180 as a processing core and a power source 1190, etc. It should be understood for those skilled in the art that the media playing device is not limited by the structure of the media playing device showed in FIG. 4, and the media playing device may include more or less units than the structure shown in FIG. 4, or include a combination of the units, or include different arrangements of the units.

The inputting unit 1130 is configured to receive input number information or character information, and to generate a key signal input associated with a user setting and a function control of the media playing device 1000.

The displaying unit 1140 is configured to display information input by a user or information provided to the user. The displaying unit 1140 may include a display panel, which is configured by using a liquid crystal display (LCD), or an organic light-emitting diode (OLED), etc. Specially, in a case that the media file is a video file, the displaying unit 1140 may display an image of the video file.

The audio circuit 1160 may provide an audio interface. The audio circuit 1160 may transmit an electric signal converted from received audio data to a loudspeaker, and the loudspeaker converts the electric signal into a voice signal for outputting. Specially, the audio circuit 1160 may output audio data associated with the media file.

The media playing device 1000 further includes a memory and one or more programs stored in the memory, and instructions included in the one or more programs when executed by one or more processors, configure the media play device to:

submit media file information to a first window; and determine whether the first window is a top-level window of a browser; create a sub-window in the top-level window of the browser, set the sub-window as the first window, load a player logic in the top-level window of the browser, and play the media file by using the player logic in the top-level window of the browser, in case that the first window is determined as the top-level window; and transfer the media file information to the top-level window of the browser to which the first window belongs, and play the media file by using the player logic in the top-level window of the browser, in case that the first window is not determined as the top-level window.

The number in the embodiments according to the disclosure is only used for description, and does not indicate advantages or disadvantages of the embodiments.

In view of above, a method and a device for playing a media file are provided according to the disclosure. By creating the hidden iframe window in the player page as the first window, the media file is submitted to the first window, and the dynamic scripting language of the top-level player page is invoked directly by the scripting language of the first window to play the media file, thereby achieving the playing of the media file without refreshing a page for user perception.

According to another embodiment of the disclosure, by executing a computer program including a program code which can play a media file when executed in a general computing device like a computer including processing units such as a central processing unit (CPU) a random access memory (RAM) and a read only memory (ROM), and a storage unit, a device and a browser for playing a media file are configured, and the media playing method according to embodiments of the disclosure are achieved.

The foregoing embodiments are only preferred embodiments of the disclosure and are not meant to limit the disclosure. All modifications, equivalent variations and improvements made without departing from the spirit and principle of the disclosure shall fall in the scope of the technical solutions of the disclosure.

The invention claimed is:

1. A method for playing a media file, comprising:
submitting media file information to a first window;
determining whether the first window is a top-level window of a browser;
creating a sub-window in the top-level window of the browser, setting the sub-window as the first window, loading a player logic in the top-level window of the browser, and playing the media file by using the player logic in the top-level window of the browser, when the first window is determined as the top-level window; and
transferring the media file information to the top-level window of the browser to which the first window belongs, and playing the media file by using the player logic in the top-level window of the browser, when the first window is not determined as the top-level window.

2. The method according to claim 1, wherein submitting the media file information to the first window comprises:
determining whether there is the first window;
submitting the media file information to the first window, when there is the first window; and
creating a first window, and submitting the media file information to the first window, when there is no first window,
wherein the first window is a browser window identified by a preset name.

3. The method according to claim 2, wherein creating a sub-window in the top-level window of the browser and setting the sub-window as the first window comprises:
modifying a name of the top-level window of the browser as a name different from the preset name;
creating a hidden sub-window in the top-level window of the browser; and
naming the sub-window as the preset name.

4. The method according to claim 1, wherein the media file comprises an audio file or a video file.

5. A device for playing a media file, comprising:
a data transferring module, configured to submit a media file to a first window; and
a playing module, configured to determine whether the first window is a top-level window of a browser; to create a sub-window in the top-level window of the browser, set the sub-window as the first window, load a player logic in the top-level window of the browser, and play the media file by using the player logic in the top-level window of the browser, when the first window is determined as the top-level window; and to transfer the media file information to the top-level window of the browser to which the first window belongs, and play the media file by using the player logic in the top-level window of the browser, when the first window is not determined as the top-level window.

6. The device according to claim 5, wherein the data transferring module is further configured to:
determine whether there is the first window;
submit the media file information to the first window, when there is the first window; and
create a first window and submit the media file information to the first window, when there is no first window;
wherein the first window is a browser window identified by a preset name.

7. The device according to claim 6, wherein the playing module is further configured to:
modify a name of the top-level window of the browser as a name different from the preset name;
create a hidden sub-window in the top-level window of the browser; and
name the sub-window as the preset name.

8. The device according to claim 5, wherein the media file comprises an audio file or a video file.

9. A non-transitory computer readable storage media, wherein computer executable instructions are stored in the non-transitory computer readable storage media, and when the computer executable instructions are executed in a computer, the following steps are performed:
submitting media file information to a first window;
determining whether the first window is a top-level window of a browser;
creating a sub-window in the top-level window of the browser, setting the sub-window as the first window, loading a player logic in the top-level window of the browser, and playing the media file by using the player logic in the top-level window of the browser, when the first window is determined as the top-level window; and
transferring the media file information to the top-level window of the browser to which the first window belongs, and playing the media file by using the player logic in the top-level window of the browser, when the first window is not determined as the top-level window.

10. A terminal comprising a central processing unit and a non-volatile storage, wherein the central processing unit operates a browser logic comprising a first window, wherein the central processing unit is configured to:
receive media file information from the first window;

determine whether the first window is a top-level window of a browser;

create a sub-window in the top-level window of the browser, set the sub-window as the first window, load a player logic in the top-level window of the browser, and play the media file by using the player logic in the top-level window of the browser, when the first window is determined as the top-level window; and transfer the media file information to the top-level window of the browser to which the first window belongs, and play the media file by using the player logic in the top-level window of the browser, when the first window is not determined as the top-level window.

11. The terminal according to claim 10, wherein the central processing unit, when to receive medial file information from the first window, is configured to:

determine whether there is the first window;

submit the media file information to the first window, in case that there is the first window; and create a first window and submit the media file information to the first window, in case that there is no first window;

wherein the first window is a browser window whose name is a preset name.

12. The terminal according to claim 11, wherein the central processing unit, when to create a sub-window in the top-level window of the browser and set the sub-window as the first window unit, is configured to:

modify a name of the top-level window of the browser as a name different from the preset name;

create a hidden sub-window in the top-level window of the browser; and name the sub-window as the preset name.

13. The terminal according to claim 10, wherein the media file comprises an audio file or a video file.

14. The terminal according to claim 11, wherein the media file comprises an audio file or a video file.

15. The terminal according to claim 12, wherein the media file comprises an audio file or a video file.

16. The method according to claim 2, wherein the media file comprises an audio file or a video file.

17. The method according to claim 3, wherein the media file comprises an audio file or a video file.

18. The device according to claim 6, wherein the media file comprises an audio file or a video file.

19. The device according to claim 7, wherein the media file comprises an audio file or a video file.

* * * * *